United States Patent [19]

Ribaudo

[11] Patent Number: 4,910,961

[45] Date of Patent: Mar. 27, 1990

[54] HYDRAULIC DOOR OPENING OR CLOSING DEVICE

[75] Inventor: Nickolas Ribaudo, Boca Raton, Fla.

[73] Assignee: Vertran Manufacturing Company, Boca Raton, Fla.

[21] Appl. No.: 53,144

[22] Filed: May 21, 1987

[51] Int. Cl.[4] .................... F16D 13/02

[52] U.S. Cl. .................... 60/476; 91/357; 91/402; 91/408; 91/409

[58] Field of Search .................... 60/328, 446, 450, 423, 60/441, 465, 473, 476; 91/408, 409, 400, 401, 402, 357; 137/533.11; 251/285

[56] References Cited

U.S. PATENT DOCUMENTS

| | | | |
|---|---|---|---|
| 1,278,863 | 9/1918 | Crusius | 137/533.11 |
| 1,301,757 | 4/1919 | Steffes | 91/409 |
| 2,202,836 | 6/1940 | Coupland | 60/473 |
| 2,212,998 | 8/1940 | Crane . | |
| 2,954,755 | 10/1960 | Pecchenino | 91/357 |
| 4,118,931 | 10/1978 | Nonnenmacher | 60/465 |
| 4,140,044 | 2/1979 | Biller | 91/408 |
| 4,151,784 | 5/1979 | Fussangel | 91/408 |
| 4,296,570 | 10/1981 | Balbach et al. | 60/476 X |
| 4,399,653 | 8/1983 | Pylat, Jr. | 60/446 |
| 4,642,986 | 2/1987 | Chatelin | 60/473 X |
| 4,696,163 | 9/1987 | Glomeau | 60/476 |
| 4,735,292 | 4/1988 | Munz | 60/476 X |

*Primary Examiner*—Edward K. Look

*Attorney, Agent, or Firm*—Kenyon & Kenyon

[57] ABSTRACT

A hydraulic door opening or closing device comprises a hydraulic fluid pump motor having two ports connected to each end of integral dual manifold and operating cylinder apparatus by way of two branch fluid lines. One branch line is fluidly connected to a particular end of the operating cylinder by way of a directional flow valve. The other branch line to the same end of the cylinder is fluidly connected to the cylinder by way of an associated manifold. Fluid communication with the cylinder through the manifold is accomplished by providing a plurality of valved openings linearly disposed along the end of the cylinder between the manifold and the cylinder. As a piston of the operating cylinder passes these openings, a door coupled to the piston is automatically slowed as fluid on the drive side of the piston is returned through the openings to the hydraulic fluid pump. A simplified control circuit coupled to the device provides three modes of operation, an opening mode, a closing mode and a reversing mode from door opening to door closing.

1 Claim, 8 Drawing Sheets

HYDRAULIC DOOR OPENING OR CLOSING DEVICE

BACKGROUND OF THE INVENTION

1. Technical Field

This invention relates to the field of designing closure apparatus for overhead sliding doors and, more particularly, to a hydraulic door opening or closing device.

2. Description of the Prior Art

In the early part of the twentieth century, elevator door closures were recognized to be too abrupt and too prone to cause accidents to cargo or passengers. Consequently, door closers and check devices involving liquid-filled cylinders or, alternatively, pneumatic enclosures for spring-loaded devices were developed to rectify the abrupt closure and safety problems.

Typical of this early art is U.S. Pat. No. 1,712,089 which issued May 7, 1929 for an Elevator Door Actuating Mechanism. There is shown in FIG. 7 a horizontal operating cylinder pressing against a spring. Fluid is supplied to the cylinder through a valve such that the cylinder opens and closes an elevator gate. Further, a dash pot is suggested to retard the downward movement of the valve as the gate is completely closed.

Eventually it was discovered that a hydraulic fluid-filled cylinder could be sequentially emptied and filled so as to drive a door opening and closer. For example, in U.S. Pat. No. 1,754,563, a valved cylinder drives a piston by fluid pressure and a dash pot retards the final closing of the door.

Today, power elevator car and hoistway doors typically utilize AC motors and various linkages of such motors with gear boxes, checks, pulleys, and so on to provide motion for power door operation. Generally, power door openers using single speed AC motors provide a constant opening and closing speed checked and slowed by air or oil checks. The air and oil check speed control arrangements must be particularly adjusted and often require supplemental control arrangements. Furthermore, AC motor systems are complicated to construct and comprise a large number parts. Many of these parts are susceptible to wear and require frequent maintenance.

With the advent of synchronous DC motors as applied to the opening and closure of elevator sliding doors, the early work in the field of hydraulics and pneumatics was not further advanced. The application of such DC motors for door opening and closure, however, advanced the degree of door control, in particular, the ability to change door opening and closing speeds and to provide a responsiveness to external stimulae, such as electric eye detection of entry and egress, control panel button selection, or control signals from a central elevator or elevator bank control system. In order to accomplish this new control and responsiveness, the complexity of such DC motor arrangements is substantially increased, especially the amount of switching add motor control hardware required. Speed control is especially complicated by the typical provision of special control systems for adjusting the speed output of the DC motors and, thus, the door opening and closing speeds.

In light of the above, it has become desirable to provide a speed-controlled door opening device that is as efficient as the known DC motor controlled arrangements, but which greatly reduces the amount of hardware required and, especially, the number of individual piece parts, and which can be factory-adjusted before shipment to the customer, reducing the installation time.

SUMMARY OF THE INVENTION

The above-stated problems and related problems of the prior art are solved with he principles of the present invention, a door opening or closing device comprising a hydraulic fluid pump having a first and a second port. The pump operates integral operating cylinder and fluid control apparatus that automatically slows the speed of the door at the end of its door opening or closing cycle.

In particular, the integral operating cylinder and fluid control apparatus includes a barrel coupled at each end to the first and second ports of the hydraulic fluid pump, a piston fluidly sealed within the barrel and coupled to the door and a means for controlling the flow of fluid of the hydraulic fluid pump to and from the barrel disposed between the barrel and the first and second ports. By means of controlling the flow of fluid, the door automatically slows to a stop upon opening or closing.

The means for controlling the flow of fluid further includes two manifolds containing a plurality of valved openings linearly disposed along the length of the barrel. While one manifold is being pumped fluid and provides a directional piston movement, at a predetermined point, the other manifold automatically converts from a directional device to a speed checking device in stepped, sequential fashion until eventually the door comes to a complete slow stop either in a fully open or closed position. Consequently, the present arrangement comprises an inherent door speed control arrangement without any requirement for additional speed control-related circuits or systems.

The device is coupled to a control circuit providing three modes of door operation: door opening, door closing and door reversing, in particular, from closing to opening operation. The present control circuit is not concerned with speed control. Consequently, the associated circuitry is simplified and, in particular, can be constructed in plug-in modular circuit board form. The control circuit comprises a pair of microswitches signaling a fully extended or fully retracted position of the piston rod and a plurality of plug-in relays activating a reversible rotation of the hydraulic fluid pump depending on the mode of door operation. Furthermore, the control system includes a timer for shutting down the pump motor in the event door travel is restricted by mechanical means for an unduly long period.

The present invention provides a door opening or closing device comprising (a) a hydraulic fluid pump having first and second ports; (b) integral operating cylinder and fluid control apparatus including: i. barrel coupled at each end to the first and second ports of the hydraulic fluid pump; ii. a piston fluidly sealed within the barrel; and iii. means for controlling the flow of fluid of the hydraulic fluid pump to and from the barrel disposed between the barrel and the first and second ports such that the door automatically slows to a stop upon opening or closing wherein the fluid flow control means comprises a plurality of openings linearly disposed along the length of the barrel for by-passing pressurized fluid from the barrel.

DETAILED DESCRIPTION

Figure 1:
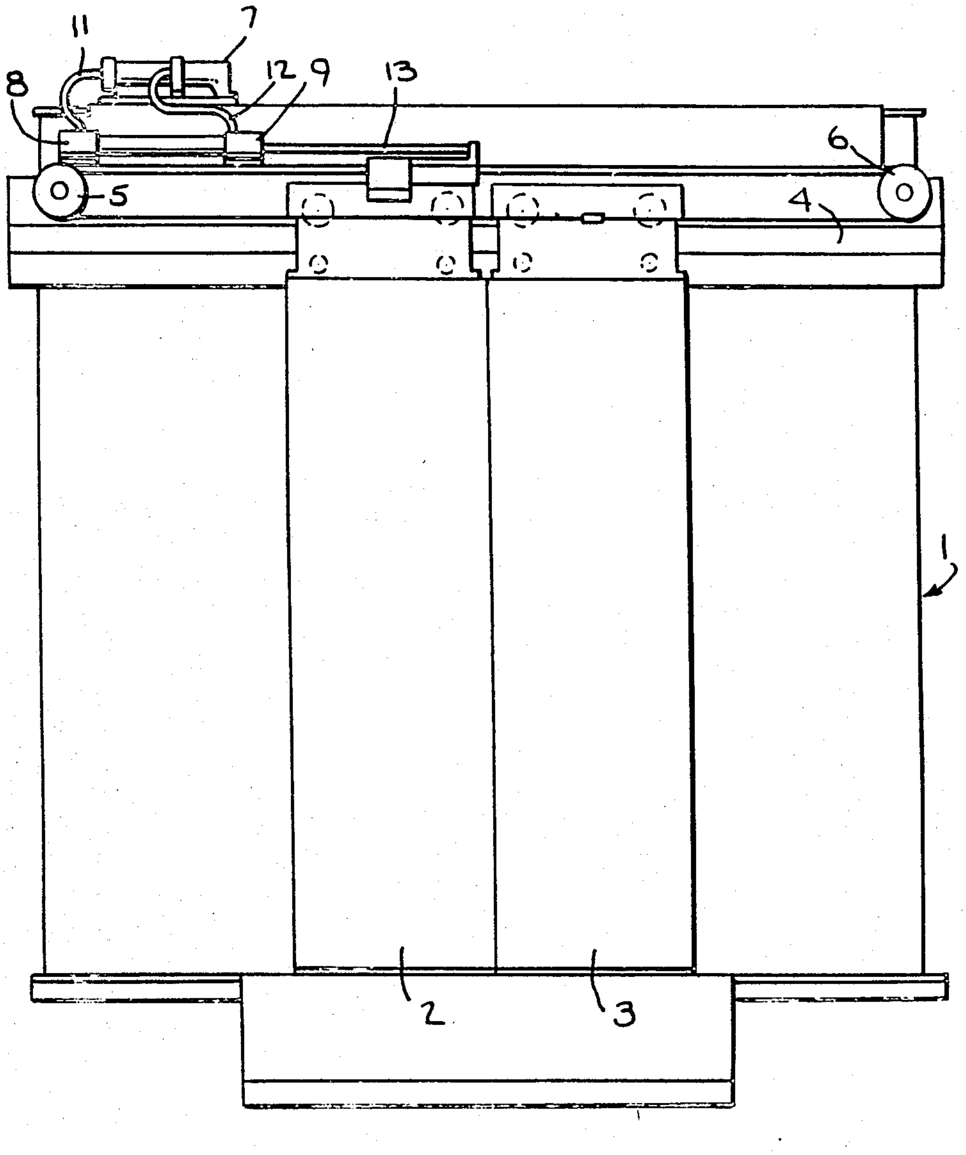
FIG. 1 is a front view of an elevator car having center opening sliding doors showing installation of the present hydraulic door opening or closing device on top of the car.
Figure 2:
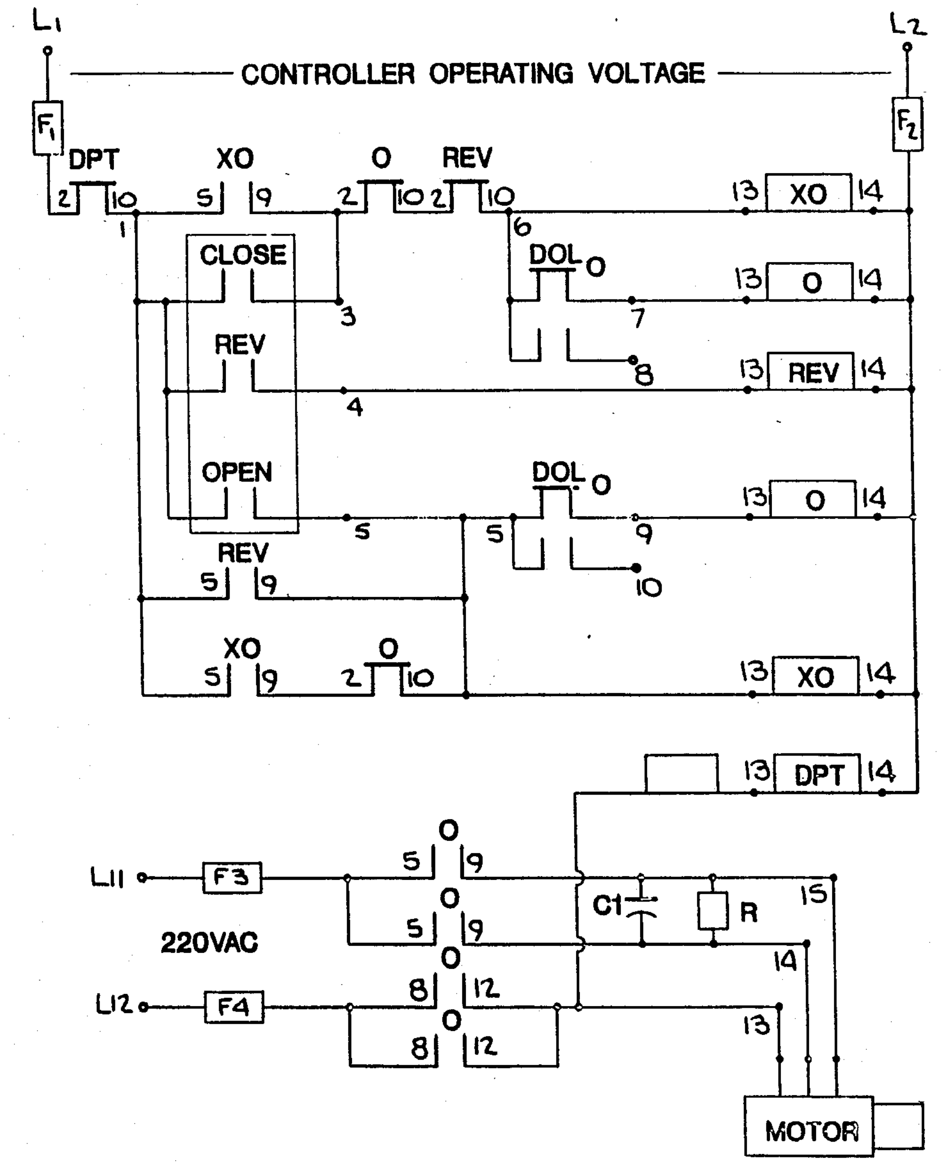
FIG. 2 is a schematic diagram of a control circuit controlling the operation of the hydraulic door opening or closing device of FIG. 1.

In FIGS. 1 to 11B similar elements have been identified with the same reference numerals or characters wherever possible. The hydraulic door opening or closing device of the present invention is particularly shown in FIGS. 1 and 3 to 11B, while a control circuit for the hydraulic door opening or closing device is shown in FIG. 2.

Referring more particularly to FIG. 1, there is shown a front view of an elevator car 1 having sliding doors 2, 3 which close in the center of the car hung on a track 4. Pulleys 5, 6 are arranged on each side of the top of the elevator car 1 such that a left-hand door 2 is drawn to the left upon track while a right hand door 3 is drawn to the right upon opening. The doors are hung from track 4 and guided along the track by upper and lower roller sets.

Some elevator car sliding doors comprise two pairs of doors opening rom one side to the other. In such a case, the door that must travel the farthest to open is typically geared so that it travels twice as fast as the other. Such an arrangement is not shown in the drawings nor are other arrangements well known in the art. However, all such arrangements may be easily adapted for application of the present device and the center sliding door arrangement shown is merely exemplary of such arrangements. Furthermore, the preset hydraulic door opening or closing device is equally suited to application in any door system such as those installed in train cars or as warehouse doors.

The hydraulic door opening or closing device comprises a rotary gear pump motor 7 having two ports which, responsive to a change in power feed, pumps in reverse direction. That is, at one point in time, hydraulic fluid line 12 connected to one port may be a pressure line while fluid line 11 connected to the other port will be a suction line and, upon a change in power feed, fluid line 11 becomes a pressure line and line 12 becomes a suction line.

One such pump which may be employed is available from Hy Pack (div. of WEAVER Corp.) which may be driven by a Franklin Electric Model 1903180400 PR1, a 220 volt, single phase motor rated at 425 watts with a full load. This Franklin Electric motor requires a run capacitor C1 of approximately fifteen microfarads. Resistor R1 (15,000 ohm, zwatt) is installed across the terminals of capacitor C1 to bleed charge from the capacitor reducing arcing of the contacts during rapid cycling.

Fluid line 11 couples pump motor 7 to a first manifold 8 which drives a piston 14 inside cylinder or barrel 10 to close doors 2 and 3 via rod 13. Rod 13 is attached in a well known manner to the doors 2 or 3 and is most conveniently in a line approximately parallel to the line of directional door movement represented, for example, by the track 4. Ideally, the pump motor 7 and its connection to the barrel 10 should be arranged so that the fluid lines 11, 12 are as short as possible.

Referring more particularly to FIG. 2 there is shown a control circuit for the hydraulic door opening or closing device shown in FIG. 1 which will be further explained by aid of FIGS. 3 to 10 showing the hydraulic door opening or closing device in operation. The control circuit of FIG. 2 is connected via fuses F1 and F2 and terminals L1, L2 to a controlled operating voltage that is chosen appropriately for operating parallel-connected relays XC, C, REV, O, and XO which, in turn are connected in series via relay DPT with one power feed line to the pump motor 7.

Power for pump motor 7 is provided via fuses F3 and F4 and 220 VAC single phase line terminals L11 and L12. As will be subsequently explained, a reversal of pump motor 7 is accomplished by an alternate feeding of power via terminal M14 or terminal M15 of motor 7 while terminal M13 of motor 7 is always coupled to line terminal L12.

The relays employed in the practice of this invention, e.g., relays O, C, XC, REV, XO and DPT, may be KU Series, Plug-in type relays available from Potter & Brumfield.

Microswitches DOL an DCL are mounted in relationship to rod 13 such that switch DOL identifies a fully retracted or door open position while switch DCL identifies a fully extended or door closed position. An example of a commercially available microswitch useful in the practice of this invention is Burgess At. No. CT2KR2-A2.

Timer circuit T1, e.g., Potter & Brumfield Type CB, is connected in series with relay DPT such that, in accordance with a timing constant, power holding either the relays O or C actuated is cut off via normally closed contacts DPT 2, DPT 10 after a predetermined timing interval. Consequently, power feeding pump motor 7 is cut off in extraordinary situations as will be described in greater detail herein.

The control circuit of FIG. 2 may be most conveniently implemented in the form of a single printed circuit board equipped with plug-in relays, fuses, microswitch contacts and other components, greatly reducing the amount of separate components required by the present invention.

Generally the control circuit shown in FIG. 2 provides three modes of operation of the hydraulic door opening or closing device of FIG. 1: a door opening mode, a door closing mode and a door reversing mode such that upon certain conditions, a door closing is reversed to a door opening operation. These three modes of operation will be explained in greater detail with reference to FIGS. 3 to 10 showing the present hydraulic door opening or closing device in various stage of operation. Signals relating to a selection of a particular mode are intercepted at control signal terminal CS.

Referring briefly and collectively to FIGS. 3 to 10, there is shown in each Figure, rotary gear pump 7 coupled to first and second manifolds 8 and 9 via hydraulic fluid lines 11 and 12 respectively, cylinder or barrel 10 and rod 13 as shown in FIG. 1. As clearly shown in FIGS. 3 to 10, rod 13 is coupled to a piston head 14 driven within barrel 10 by fluid pressure. Fluid lines 11 and 12 each branch into two branch lines. Branch lines 15 and 16 are connected to opposite ends of barrel 10 via two directional flow valves 17 and 18 respectively. The other branch lines 19 and 20 each run to a plurality of ball valves linearly spaced along each end of barrel 10. First manifold 8 comprises five such bal valves 21 to 25 and second manifold 9 also comprises five such ball valves 26 to 30. Each such ball valve is fluidly coupled between an associated branch line and the barrel 10 via a ball such that in a down position an opening to barrel 10 is closed and in an up position fluid flow is permitted between barrel 10 and an associated branch line in accordance with a screw adjustment as will be more particularly described in a discussion of FIGs. 11A and 11B.

In particular, branch line 19 parallels barrel 10 in the vicinity of ball check valves 21 to 25. Depending on the position of piston 14, these ball check valves 21 to 25 provide a fluid bypass to a flow of fluid via branch line 15. In a similar manner, ball check valves 26–30 provide a fluid bypass to a flow of fluid via branch line 16. Useful flow control check valves are commercially available, e.g., Detroit Fluid Products part no. EC10B.

It can be seen in the Figures that ball check valves 21 to 25 and 26 to 30 and ports 21′ to 25′ and 26′ to 30′ (FIG. 13) provide a pair of sets of ports in communication with the interior of the cylinder. Each set of ports extend for a predetermined distance along the length of the cylinder and are spaced from opposite end portions of the cylinder toward a central portion thereof. The ports of each of the sets are uncovered when the piston is in a rest position adjacent one of the different opposite end portions of the cylinder. Means for alternately connecting one of the passages and one set of the ports adjacent thereto to a source of high fluid pressure while connecting the other of the passages and the other set of ports adjacent thereto to a low fluid pressure. The piston in response to the high fluid pressure connected to one of the passages is initially moved from a rest position adjacent one end of the cylinder toward the central portion of the cylinder while the one set of ports spaced adjacent to the one end position of the cylinder is adapted to by-pass a portion of the flow from the source of high fluid pressure around the piston. The piston when subsequently moved to intersect successively the ports of the one set of ports progressively reduces the by-passing of the portion of the flow and thereby accelerates within the cylinder. The piston when moving into the central portion of the cylinder and progressively beyond the ports of the one set of ports reaches a maximum velocity. The piston when successively intersecting the ports of the other set of ports being subjected to a deceleration by fluid by-pass pressure resulting from the flow of high pressure fluid through the other set of ports being successively intersected by the piston, and the piston when being decelerated moving to the other end portion of the cylinder to a rest position adjacent thereto.

It will be further appreciated that the cylinder may be provided with closed wall portions extending for a predetermined distance from a different opposite end portion thereof toward a central portion of the cylinder forming dwell regions.

Figure 3:
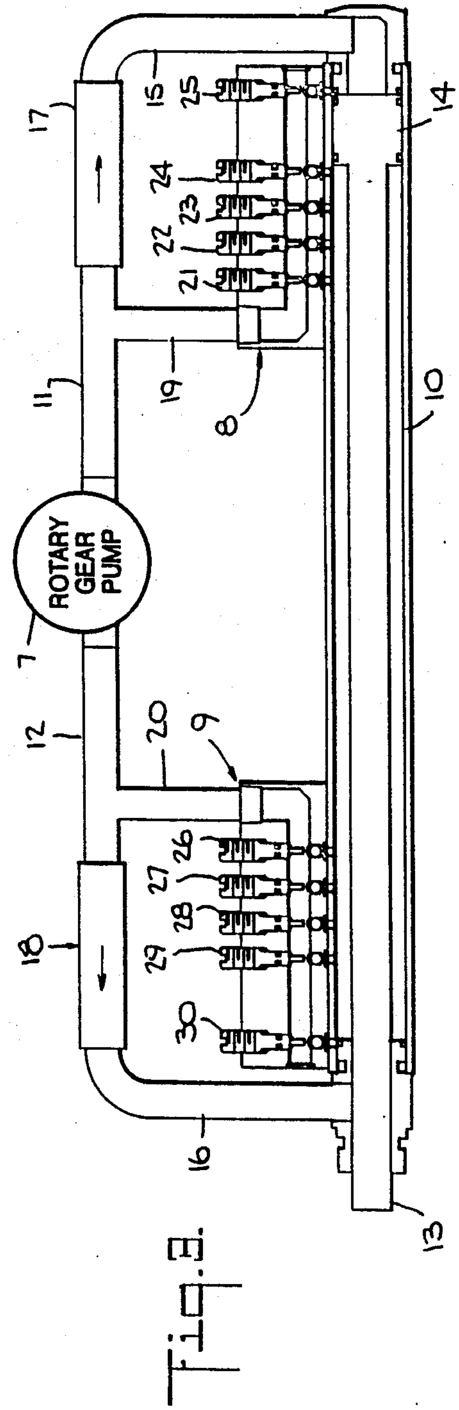
FIG. 3 is a front view of the hydraulic door opening or closing device of FIG. 1, a horizontal cylinder or barrel being shown in cross-section exposing a horizontal rod and a piston in fully retracted position and first and second manifolds each comprising a plurality of ball check valves, the ball check valves of the first or left-most manifold shown in a raised or open position and the ball check valves of the second or right-most manifold shown in a lowered or closed position.
Figure 11A:
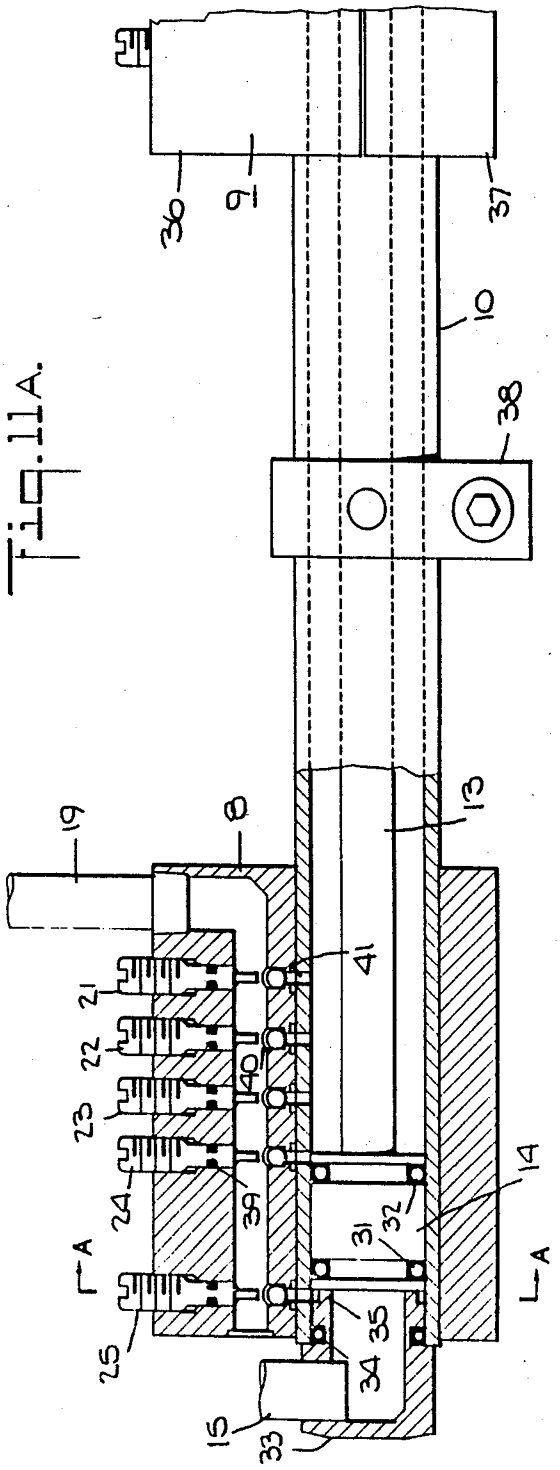
FIG. 11A is a detailed front cross-sectional view of one manifold of the hydraulic door opening or closing device of FIGS. 3 to 10, showing adjustment screws for the plurality of ball check valves of the manifold.
Figure 11B:
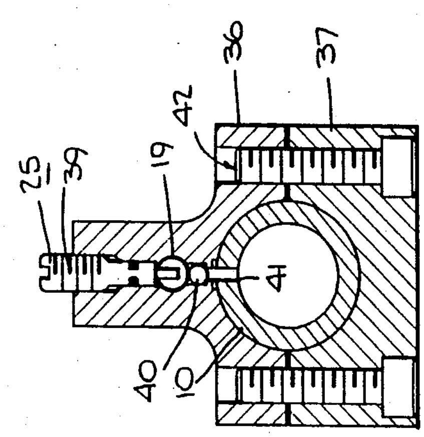
FIG. 11B is a lateral cross-sectional view along the axis A—A of FIG. 11A.

The only wearing parts associated with the device of FIG. 3 are two sets of O-rings, one set for the piston 14, and the other set for the sealing of rod 13 at the branch line 16 end of the barrel 10. Consequently, the present device is easily maintained once installed. Referring briefly to FIG. 11A and 11B, ball valves 21 to 30 may be preadjusted by way of set screws 39 for a particular sliding door operation before the device is shipped to the destination of its intended application.

Referring now to FIGS. 2 to 10, the operation of the present device will be explained in detail. It will be assumed that, for the purposes of this discussion, the pump motor 7 and barrel 10 have undergone a door opening operation, that the pump system is primed and that all the air has been purged from the barrel 10, the manifolds 8 and 9 and the hoses 11, 12, 15, 16, 19, 20.

Referring briefly to FIG. 2, a command signal to close the elevator doors is generated from a main elevator control panel, typically in an elevator machine room (not shown). The command signal is transmitted to the control circuit of FIG. 2 via control signal terminal CS. The receipt of the control signal at terminal CS closes the contacts CLOSE between terminals COM 1 and CS3. This is accomplished, for example, by relay actuation.

The contacts CLOSE of terminal CS being closed, an electrical path is formed via terminal L1, fuse F1, closed contacts DPT2 and DPT10, normally closed contacts 02 and 010, and normally closed contacts REV2 and REV10 to the parallel connection of hold closed relay XC with close relay C via normally closed door close limit switch DCL contacts DCL6 and DCL7.

With the operation of hold closed relay XC, associated relay contacts XC5 and XC9 are closed temporarily holding relay XC actuated after the close contacts CLOSE of terminal CS are opened. As can be seen by the series connection of contacts XC5, XC9, 02, 010, REV2, and REV 10, either the actuation of the open relay O or the reverse relay REV will release relay XC.

At the same time, close relay C is actuated via the normally closed contacts DCL6, DCL7 of door close limit switch DCL. Normally open close relay contacts C5, C9 now close a path providing power via terminal L11 and terminal M14 to pump motor 7 and via close relay contacts C8, C12 to power terminal L12. The power connection of motor terminals M14, M13 ensures that the pump motor 7 runs in such a direction as to close the elevator doors. Upon closure of either 08 or 012 or C8 and C12 the applied voltage from line 12 is connected to the line side of delay time T1. If either of the O or C relays are energized longer than the time constant value for TI then the DPT relay is energized.

Referring now o FIG. 3, the rotary gear pump 7 establishes a pressure in fluid line 11 and a suction in fluid line 12. Fluid is at first pumped through directional flow control valve 17 into the barrel 10 by way of branch line 15.

At the same time, since there is pump pressure in the branch line 19 to first manifold 8, the ball check valves 21 to 25 of the first manifold 8 are forced into a down or closed position eliminating any fluid flow toward the pump motor via this manifold at this time.

Consequently, pump motor fluid flow is diverted by way of flow valve 17 and through line 15 into the end of the barrel 10. Piston 14 is forced away from this end of the barrel 10 simultaneously causing an extension of the rod 13.

Figure 4:
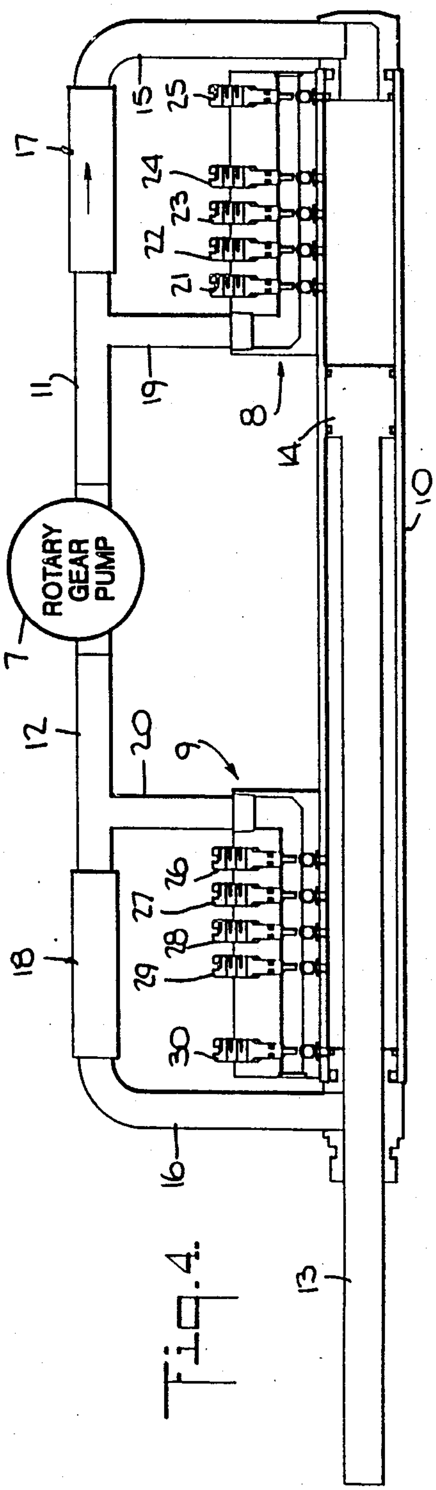
FIG. 4 is a front view of the hydraulic door opening or closing device of FIG. 3, the rod and piston in partially extended position.

Referring now to FIG. 4, once the barrel 10 has begun to pressurize at its other end and the piston 14 begins to move, the ball checks 26 to 30 in the second manifold 9 are forced upward into their open positions. This opening of ball check valves 26 to 30 of the second manifold 9 provides a path via branch line 20 for exhaust fluid from the previous cycle of barrel/piston operation. At this point in time, the flow control valve 18 for the branch line 16 has not been actuated. There is no flow of hydraulic liquid in line 16.

Figure 5:
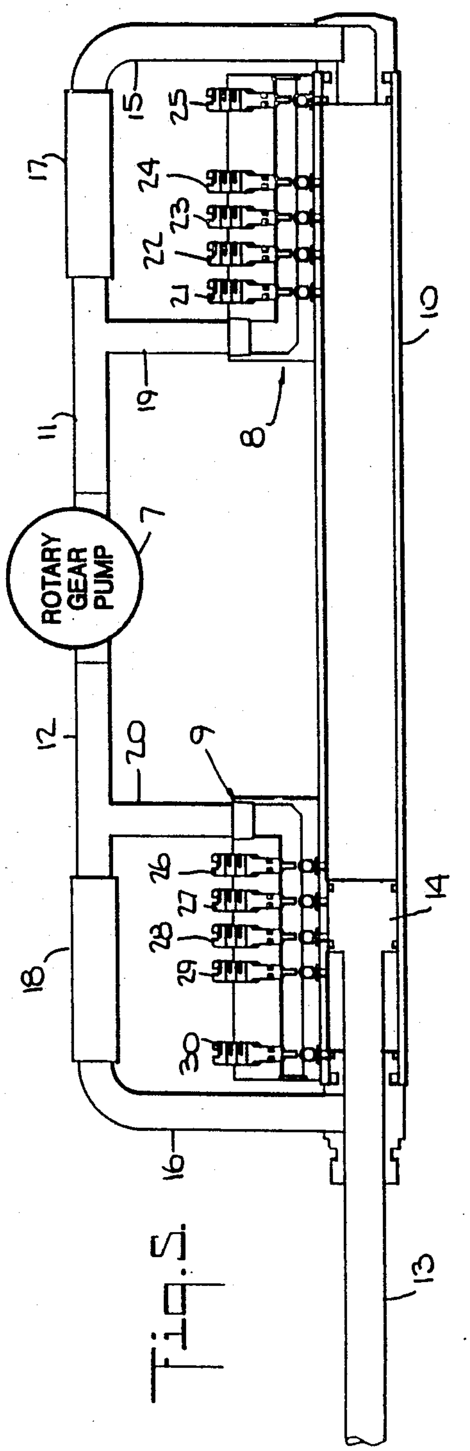
FIG. 5 is a front view of the hydraulic door opening or closing device of FIG. 3, the rod and piston in mostly extended position.

Referring now to FIG. 5, the piston 14 and rod 13 have traveled outward at a constant velocity driven by the continuous operation of pump motor 7. When the pressurized side of piston seal 14 passes the first opening in the wall of the barrel 10 to the first ball check valve 26, the velocity of the piston 14 and rod 13 reduces. This reduction in piston velocity relates to a reduction in pressure on the drive side of piston 14 caused by a portion of the hydraulic fluid under pressure being by-passed directly back to the pump motor 7 via branch line 20 and fluid line 12. A further decrease in piston velocity follows as the piston 14 passes each ball check valve 26 to 29. Without the aid of any external speed control arrangement, the second manifold 9 automatically converts to a bypassing operation from a completely directional operation providing an inherent speed control.

Figure 6:
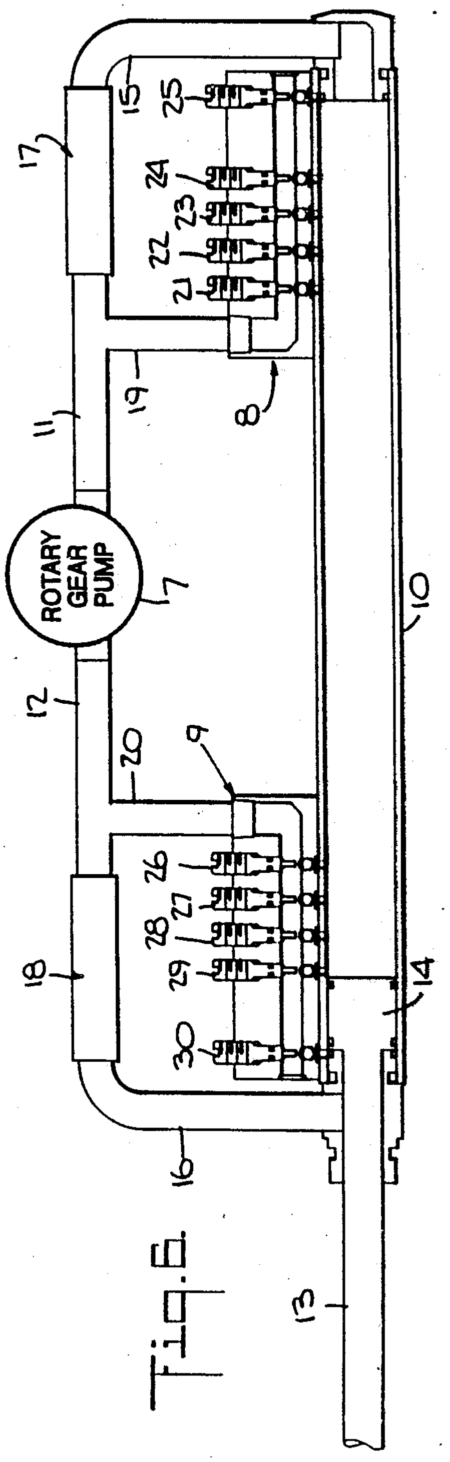
FIG. 6 is a front view of the hydraulic door opening or closing device of FIG. 3, the rod and piston in fully extended position, the ball check valves in the same position as is shown in FIG. 3.

Referring to FIG. 6, by the time piston 14 passes ball check valve 29, valves 26 to 29 are all bypassing fluid back to pump motor 7 and only ball valve 30 is releasing fluid pressure on the driven side of the piston 14. With this slow release of fluid through ball valve 30 there is a correspondingly slow directional movement of piston 14. Consequently, by far the majority of the hydraulic fluid transmitted via line 11 is being by-passed through the reservoir formed in the barrel 10 directly back to the pump motor 7 when the piston 14 is near the end of its travel distance.

In other words, each time a ball check valve of the valves 26 to 29 of manifold 9 is passed, the piston 14 and rod 13 undergo an approximately constant decrease in velocity given a particular preset adjustment of set screws of the valves 26 to 29. Adjustment of the set screws 39 (FIGS. 11A and 11B) for valve 30 will establish a final slow speed to stop motion of the piston rod 13. This adjustment must take into consideration the inertia generated by varying weights of different door configurations, sizes and materials used to fabricate the doors. However, if these are known, as suggested previously, all settings can be preset during the manufacture of the present device.

Referring again to FIG. 2, after the rod 13 is totally extended, the door close limit switch DCL is mechanically actuated. Normally closed contacts DCL6, DCL7 open at this time de-energizing close relay C. This de-energization of close relay C results in the opening of close relay contacts C5, C9, C8, C12 turning power off to pump motor 7.

Despite the de-energization of close relay C, parallel connected relay XC does not de-energize as its hold up path is still preserved. Consequently, relay XC provides a latching memory circuit which safeguards against opening, for example, passengers pulling the car door open while the elevator is in motion or a condition known as door sag, an unintentional, premature opening (or closing) of the doors. In such situations, the door close microswitch contacts DCL6 and DCL7 return to their normally closed position energizing close relay C and turning power back on feeding pump motor 7 via motor terminals M13 and M14. In this manner, the correct, closed door position is maintained until a command to open is transmitted to control signal terminal CS.

Now the door opening mode of operation will be described. Referring again to FIG. 2, a command signal to open the elevator door is transmitted to control signal terminal CS from the main elevator controller. As a result, open contacts OPEN are closed and a path is established by line terminal L1 through normally closed switch DOL energizing open relay O.

At the same time, hold open relay XO is energized holding open relay O and hold open relay XO energized. This holding open is caused by way of the closure of normally open hold open relay contacts X05 and X09.

Figure 7:
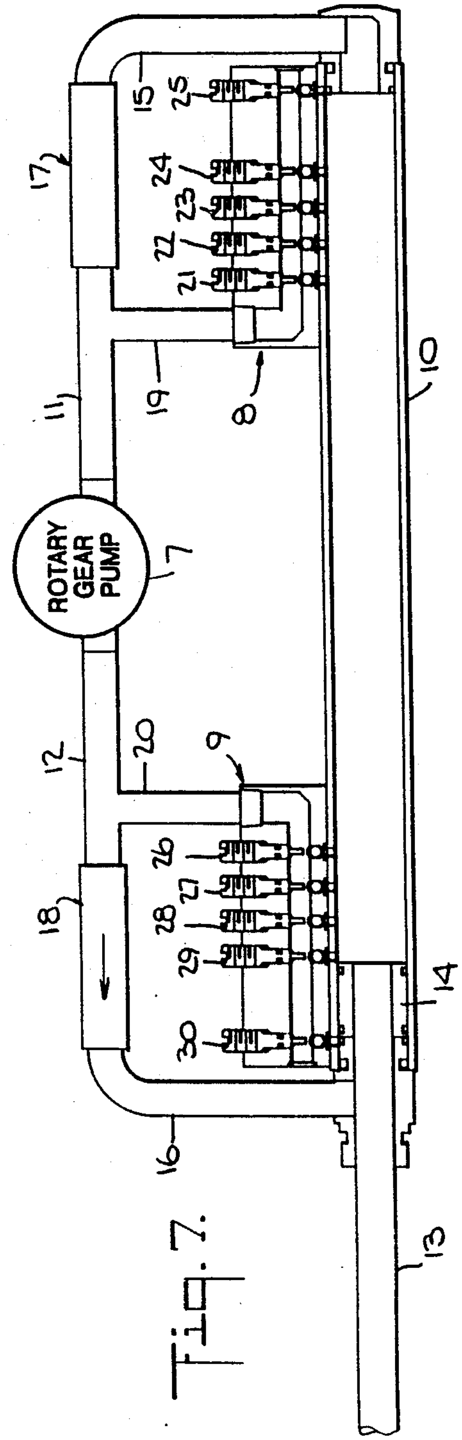
FIG. 7 is a front view of the hydraulic door opening or closing device of FIG. 3, the rod and piston in fully extended position, the ball check valves of the first or left-most manifold shown in a lowered or closed position and the ball check valves of the second or right-most manifold shown in a raised or open position.

With the energization of open relay O, its corresponding normally open contacts 05, 09, 08, 012 are closed. Power is thus fed to pump motor 7 via motor contacts M15, M13 and the pump motor operates in reverse rotation. Referring to FIG. 7, a pressure is created in fluid line 12 while a suction is created in fluid line 11. Consequently, fluid is now pumped through directional flow control valve 18 by way of branch line 16 into the end of barrel 10. Fluid also presses into branch line 20 and into second manifold 9.

Because of the increased pressure in the second manifold 9 and the pressure in the first manifold 8 is only residual pressure subject to exhaust back to suction line 11, the several ball check valves 26 to 30 in the second manifold 9 are forced into their closed or down position. In particular, this is accomplished by the effects of the pump motor pressure applied to the surface area of the balls of the ball check valves 26 to 30 on the manifold side of the balls as compared with the reduced pressure effects on the surface area of the barrel side of the balls via the small holes in the barrel wall.

Figure 8:
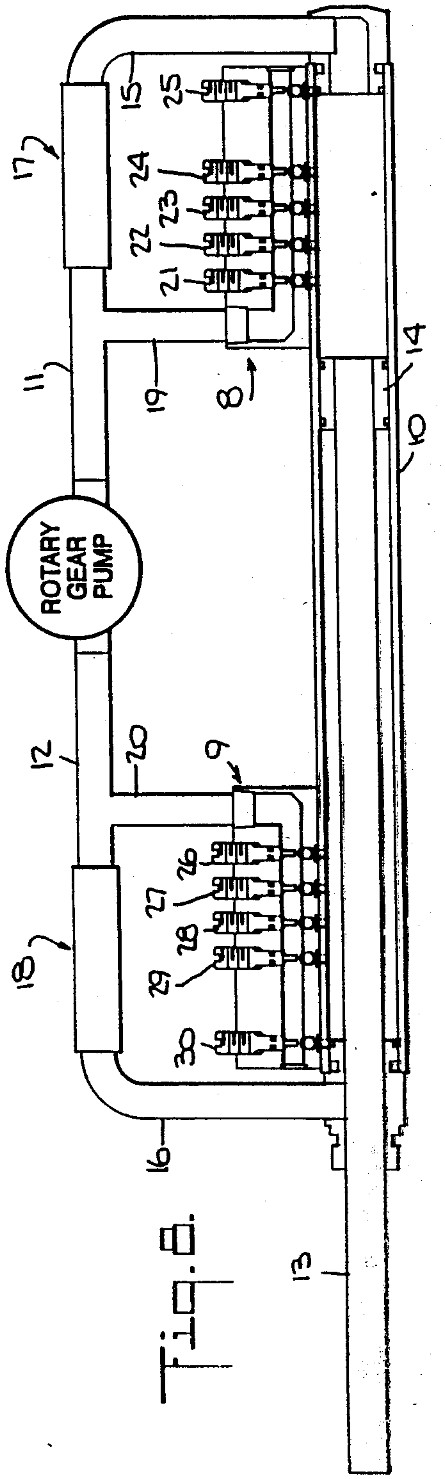
FIG. 8 is a front view of the hydraulic door opening or closing device of FIG. 3, the rod and piston in partially retracted position.

Referring now to FIG. 8, as the device pressurizes, the fluid from pump motor 7 flows through line 12 via flow valve 18 and branch line 16 into the barrel 10. The ball valves 26 to 30 all being closed, the piston 14 is forced to retract and the rod 13 is driven inward.

At the same time, all the ball valves 21 to 25 of the first manifold 8 are forced to open and their associated balls are shown in an uppermost position due to the exhausting of the fluid from the barrel 10 from the already described close cycle. The fluid returns via first manifold 8, branch line 19, and fluid line 11 to pump motor 7.

There is no fluid flow through directional flow control valve 17 at this time. All the fluid exhausts via ball check valves 21 to 25.

Figure 9:
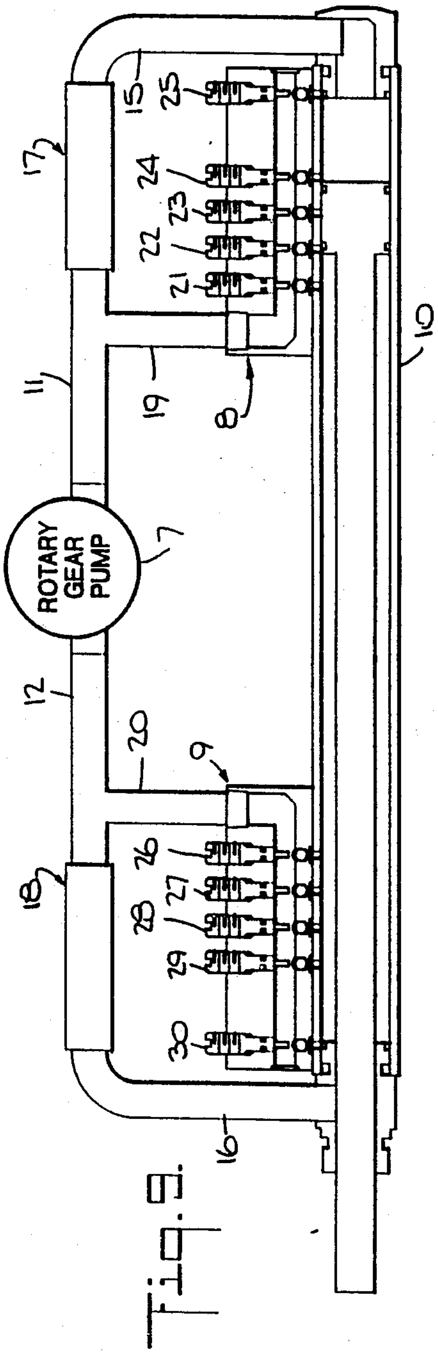
FIG. 9 is a front view of the hydraulic door opening or closing device of FIG. 3, the rod and piston in mostly retracted position.

Referring to FIG. 9, the piston 14 and rod 13 continue to retract at a relatively constant velocity. As soon as the pressurized side of the piston passes the first ball check valve 21 of the first manifold 8, a portion of the pressurized fluid can bypass via open ball check valve 21 and branch line 19 directly to rotary gear pump 7. Consequently, there is a reduction in the velocity of piston 14.

Figure 10:
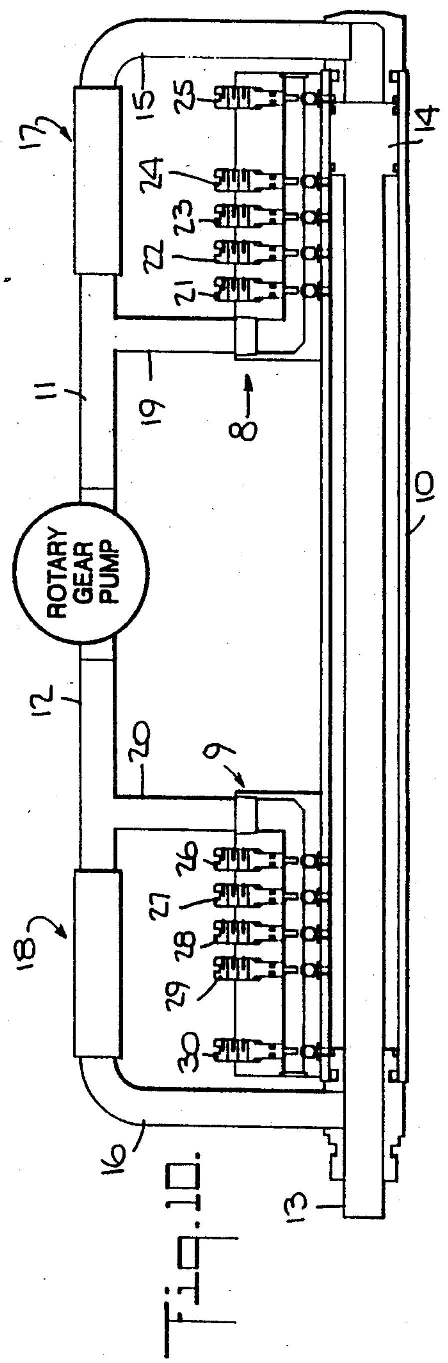
FIG. 10 is a front view of the hydraulic door opening or closing device of FIG. 3, the rod and piston in fully retracted position.

Referring now to FIG. 10, as the piston 14 passes each barrel opening to a ball check valve 22 to 24, the first manifold 8 is simultaneously converted from providing entirely directional operation to a bypassing operation. In step-wise fashion, the speed of piston 14 is continuously decreased as it passes ball check valves 21 to 24 until finally only ball check valve 25 releases fluid pressure on the driven side of piston 14 thus permitting a slow directional movement by exhausting fluid from barrel 10.

As for the closing operation, set screws of ball check valves 21 to 25 may be preset at the location of manufacture of the present device to establish a particular deceleration of piston 14 for the door opening operation. Eventually, the piston reaches its limit actuating the door open limit switch DOL.

Referring to FIG. 2, door open limit switch DOL has normally closed contacts DOL5, DOL9 which open at this time. This contact opening deenergizes open relay O turning off the pump motor 7.

Hold open relay XO does not deenergize at this time as a hold open path is preserved through normally closed close relay contacts C2, C10. As with the door closure mode of operation, the hold open path including hold open relay XO creates a path to normally closed switch DOL such that in the event door open limit switch contacts DOL5, DOL9 are re-closed, the open relay O is automatically energized reopening the door. Consequently, hold open relay XO provides a safeguard against a door sagging, that is, a premature door closing caused by door closing spring action or an intentional passenger intervention.

Now, the door reversal mode of operation will be described wherein a door closing operation is automatically reversed to a door opening operation.

Referring again to FIG. 2, during closing, it is necessary at times to reverse the operation because, for example, cargo or passengers have not completed their entry or exit. In this event, a door reversal command signal is transmitted to command signal terminal CS and closes a closure of reverse contacts REV. As a result, a path is closed between terminal L1 through relay winding REV to terminal L2. The energization of reverse relay REV in turn causes an opening of normally closed reverse relay contacts REV2, REV10 and a closure of normally open reverse relay contacts REV5, REV9.

The opening of reverse relay contacts REV2 and REV10 deenergizes the hold closed path to the parallel-connected close and hold closed relays C and XC respectively. With the deenergization of the close relay C, in particular, the close relay contacts C5, C9, C8, C12 return to their normally open position. As a result, the pump motor loses power and stops.

On the other hand, reverse relay contacts REV5, REV9 are closed and energize the open relay O by way of normally closed door open limit switch DOL. Consequently, the pump motor 7 is provided power via motor terminals M13, M15 and now closed open relay contacts 05, 09, 08, 012.

At the same time as reverse relay contacts REV5 and REV9 are closed, hold open relay XO is energized and closes normally open contacts XO5, XO9. In this manner, open relay O is preserved after switch contacts REV of terminal CS return to their normally open state.

The pump motor 7 continuously runs generating a pressure in line 12 to reopen the door no matter what position the piston was in during its closing cycle, that is, as shown in FIGS. 3-6, at the time the reversal command signal is received. The hold open relay XO maintains the doors in an open position until a command signal to close is transmitted to command signal terminal CS.

Referring again to FIG. 2, the operation of a protection timing circuit, comprising delay timer T1 and protection relay DPT, will be described. The purpose of the protection timing circuit is to turn off the pump motor 7 in the event that door travel is restricted by, for example, obstructions in the sliding doorsill, the doors being knocked off track 4 or other obstructions.

Delay timer T1 is connected on one side to motor terminal M13 and on the other side to protection relay DPT. As explained before, protection relay DPT comprises normally closed contacts DPT2, DPT10 which are wired in series between the line voltage applied at terminal L1 and the controller circuit. The time constant of delay timer T1 is established at the predetermined travel time for one door cycle, either opening or closing.

In the event that the pump motor 7 runs longer than the time constant, the delay timer T1 is energized and, at the same time, protection relay DPT is energized. The energization of relay DPT in turn causes normally closed protection relay contacts DP2, DP10 to open. Consequently, the entire controller is deenergized. Power is turned off to pump motor 7 due to the deenergized open relay O or close relay C.

The controller circuit may be reactuated by turning the emergency stop switch (located within the elevator cabin) to OFF (not shown). This would automatically return protection relay contacts DPT2, DPT10 to their normally closed position. When such a emergency stop switch is returned to a RUN position, the controller circuit is already initialized and prepared to receive a door open, door close, or door reverse signal at terminal CS.

Referring more particularly to FIG. 11A, the construction and ease of maintenance of the integral cylinder and dual manifolds of the present hydraulic door opening or closing device will be discussed in greater detail.

The device shown in FIG. 11A is assembled from a barrel 10 into which is inserted a piston 14 and rod 13. Piston 14 is provided before its insertion with first and second O ring seals not particularly shown. However, annular grooves 31,32 are shown for seating the pair of O rings. An end cap 33 seals the barrel 10 at one end while, at the same time, provides an opening to fluid branch line 15. The end cap 33 is sealed inside the barrel 10 by an O-ring which is seated in annular groove 34 of the end cap. End cap 33 is also provided with an annular recessed shoulder 35 at its open end to the barrel 10. The recess of the shoulder 35 permits hydraulic fluid to flow to the final ball check valve 25 while at the same time is a stop for the full retraction of the rod 13. These O rings are the only parts susceptible to wear and, hence, replacement in the present hydraulic device.

A similar end cap, not shown, is provided at the other end of the barrel 10 but additionally comprises a third opening which is fluidly sealed about the rod 13. It also is sealed with the barrel 10, by an O ring and comprises a shoulder similar to shoulder 35.

From the second manifold 9, sown in partly cut-away view at the right of FIG. 11A, it can be seen that each manifold comprises two blocks, an upper ball check valve containing block 36 and a lower clamping block 37. These are clamped together by bolts or other fastening devices about barrel 10.

Referring more particularly to the ball valve containing block of the first manifold 8, it can be seen that branch fluid line 19 terminates in that block at pressure seal 38-which is seated in an annular shoulder of the block.

First manifold 8 comprises five ball check valves 21–25. By way of example, each ball check valve comprises a set screw and a floating ball valve portion for fluidly communicating via opening 41 with barrel 10. The set screw is fluidly sealed in a cylindrical channel of the manifold by way of a washer seated in an annular groove. A longitudinal extension of the screw limits the extent of opening or the upward movement of ball 40. Lastly, barrel opening 41 to the ball valve is sealed to the upper block of the manifold 8 by a sealing washer seated in an annular groove of the manifold.

The entire integral unit can be preassembled as described and preadjusted at the location of manufacture for a particular application. Subsequently, it can be appropriately installed to an elevator car via a holding clamp 38 or other securing device. After the motor is coupled via the supply and branch feed lines, fluid such as oil may be appropriately introduced and all the air removed from the lines in accordance with known practice.

Referring now to FIG. 11B, there is shown a cross section of the first manifold 8 along the axis A—A. From this perspective, barrel 10, upper valve containing block 36, and clamping block 37 may be seen held together by way of clamp block screws 42. Also, ball check valve 25 can be seen in detail comprising adjusting set screw 39 and ball 40 fluidly communicating with barrel opening 41. The longitudinal extension of the set screw 39 can be seen to limit the upward ascent of ball 40 and, consequently, the degree of opening of ball check valve 25.

Figure 12:
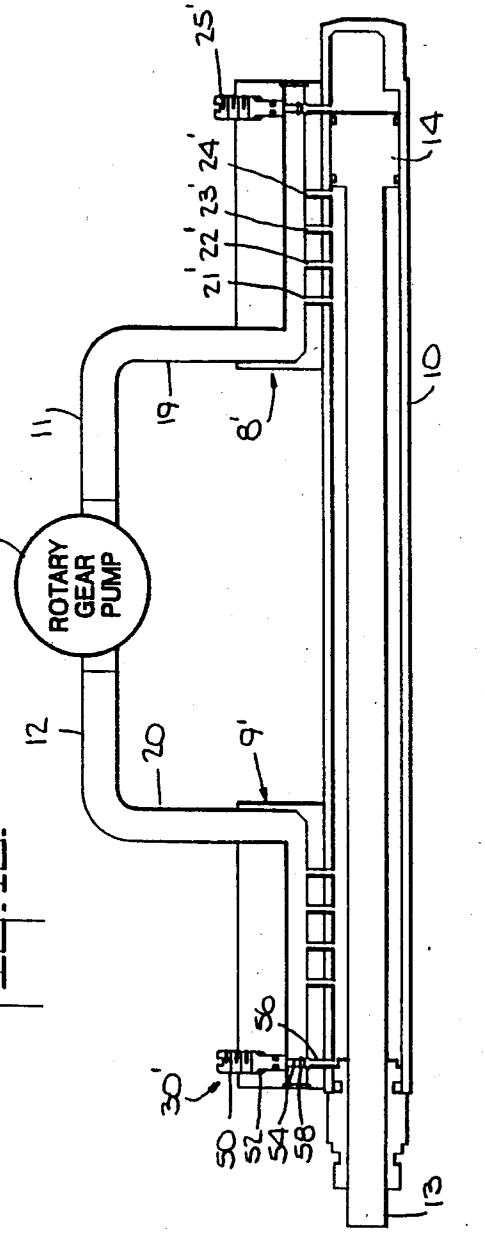
FIG. 12 is a front view of an alternate embodiment hydraulic door opening or closing device of this invention having a modified arrangement flow control/check valve.

Referring now to the alternative embodiment of FIG. 12 there is shown a rotary pump 7 fluidly coupled to first and second manifolds 8′ and 9′ via hydraulic fluid lines 11, 19, 12 and 20, respectively and barrel 10 for driving piston 14 as discussed above in connection with the other FIGS. It can be seen that while the embodiment shown in FIG. 12 includes a hydraulic cylinder having an integral manifold it differs from the embodiment described above in that the ball valves 21 to 24, and 26 to 29, and replaced with ports or openings 21′ to 24′ and 26′ to 27′, and flow valves 17 and 18 and the branch lines 15 and 16 have been eliminated. The ports 21′ to 24′ and 26′ to 29′ are shown out of scale and it will be appreciated that in practice they will be sized to by-pass pressurized fluid out of barrel 10 from either the front or rear of piston 14 depending the pistons direction of travel and position in barrel 10 to slow its travel rate as described above. The ports operate in the same manner as ball valves except that they cannot be easily adjusted. In this embodiment the pressurized fluid driven by pump 7 flows via first fluid line 11 and branch line 19 to first manifold 8′ to drive piston 14 to the left (as shown). Only a small amount of piston 14 movement, e.g., 1/16 inch, is required to close port 24 and sequentially ports 23′, 22′ and 21′ accelerating the piston 14 as it moves to the left because of the increased volume of pressurized fluid driving the piston. Similarly, piston 14 is slowed to a stop by sequential opening of ports 26′ to 30′ at the opposite end of the barrel 10. When pump 7 is reversed the pressurized fluid flows in the opposite direction via a second fluid line 12 and branch line 20 to second manifold 9′ and the above-described piston 14 action is reversed. Valves 25′ and 30′ perform substantially the same function as ball valves 25 and 30 and could be of the same construction.

Valve 30′ is illustrative having a head 50 seated in a bore in and threadably engaged with manifold 9′. An O-ring 52 forms a fluid seal between valve 30′ and manifold 9′. Stem 54 projects from head 50 into manifold 9′ and has a tapered end 58 adjacent port 56. Rotation of head 50 causes tapered end 58 to move with respect to port 56 thereby variably restricting or regulating the passage of fluid through port 56.

From the foregoing it will be understood that the embodiment of FIG. 12 is a simplified design that operates in substantially the same manner as the embodiment described above in connection with FIGS. 1 to 11B.

Thus there has been shown and described one embodiment of a hydraulic door opening or closing device with reference to one particular application for opening dual center opening sliding doors of an elevator car. It will be apparent to those skilled in the art that the principles of the invention as described can be applied to other physical arrangements and applications, and it is not intended to limit the scope of the invention to the specific embodiment shown by way of example.

What is claimed is:

1. In an actuator adapted to be operated by fluid pressure having an elongated cylinder, a piston of predetermined length having a head portion and a rod portion the head portion having two ends and the rod portion extending from one of those ends, a pair of cylinder heads each closing a different opposite end portion of the cylinder, one of the cylinder heads having an opening therein for forming a sealable and slidable fit with the piston rod extending therethrough, and a pair of passages each in communication with the interior of the cylinder adjacent a different opposite end portion thereof, each of the passages being adapted to be connected alternately to a source of fluid pressure to drive the piston along the length of the cylinder, the improvement comprising the cylinder having closed wall portions each extending for a predetermined distance from a different opposite end portion thereof toward a central portion thereof to form dwell regions within the cylinder, the predetermined distance being at least equal to the predetermined length of the piston, the cylinder further having a pair of sets of a plurality of ports in communication with the interior of the cylinder, each of the sets of ports extending for a predetermined distance along the length of the cylinder from a different one of the dwell regions of the cylinder toward the central portion thereof, and means for alternately connecting one of the passages and one set of the ports adjacent thereto to a source of high fluid pressure while simultaneously connecting the other of the passages and the other set of ports adjacent thereto to a region of low fluid pressure, the piston in response to high fluid pressure connected to one of the passages initially being adapted to be moved from a rest position adjacent one end of the cylinder and through the one dwell region adjacent thereto toward the central portion of the cylinder while the one set of ports adjacent to the one dwell region being adapted to by-pass a portion of the flow from the source of fluid pressure around the piston, the piston when subsequently being moved to beyond the one dwell region intersecting successively the ports of the one set of ports and progressively reducing the by-passing of the portion of the flow and thereby being accelerated within the cylinder, the piston when moving into the central portion of the cylinder and progressively beyond the ports of the one set of ports reaching a maximum velocity, the piston when successively intersecting the ports of the other set of ports being subjected to a deceleration by high pressure fluid by-pass resulting from the flow of fluid through the other set of ports being progressively intersected by the piston, and the piston when being decelerated passing into the dwell region of the cylinder to a rest position adjacent thereto.

* * * * *